(12) United States Patent
Goldman

(10) Patent No.: US 8,257,591 B2
(45) Date of Patent: *Sep. 4, 2012

(54) METHODOLOGY FOR FILTERING A FLUID USING A PLURALITY OF SURFACE FILTRATION MEDIUMS

(75) Inventor: Michael A. Goldman, Boca Raton, FL (US)

(73) Assignee: Mechanical Manufacturing Corp., Sunrise, FL (US)

( * ) Notice: Subject to any disclaimer, the term of this patent is extended or adjusted under 35 U.S.C. 154(b) by 679 days.

This patent is subject to a terminal disclaimer.

(21) Appl. No.: 11/927,948

(22) Filed: Oct. 30, 2007

(65) Prior Publication Data

US 2009/0107930 A1 Apr. 30, 2009

(51) Int. Cl.
*B01D 29/00* (2006.01)
*B01D 29/50* (2006.01)
*B01D 29/11* (2006.01)
*C02F 1/00* (2006.01)

(52) U.S. Cl. ............... 210/335; 210/322; 210/767

(58) Field of Classification Search ............ 210/488, 210/489, 490
See application file for complete search history.

(56) References Cited

U.S. PATENT DOCUMENTS

| | | | |
|---|---|---|---|
| 2,386,684 A * | 10/1945 | Hermanson | 210/489 |
| 3,260,370 A | 7/1966 | Schwartzwalder | |
| 3,787,277 A | 1/1974 | Oomen et al. | |
| 4,181,514 A | 1/1980 | Lefkowitz et al. | |
| 4,371,376 A * | 2/1983 | Dick, Jr. | 210/767 |
| 4,594,162 A | 6/1986 | Berger | |
| 4,842,739 A | 6/1989 | Tang | |
| 4,863,602 A | 9/1989 | Johnson | |
| 4,921,606 A | 5/1990 | Goldman | |
| 5,053,125 A | 10/1991 | Willinger et al. | |
| 5,246,581 A | 9/1993 | Goldman | |
| 5,755,962 A | 5/1998 | Gershenson et al. | |
| 5,762,797 A * | 6/1998 | Patrick et al. | 210/497.1 |
| 5,770,077 A | 6/1998 | Goldman | |
| 5,910,247 A | 6/1999 | Outterside | |
| 6,110,249 A | 8/2000 | Medcalf et al. | |
| 6,274,041 B1 | 8/2001 | Williamson et al. | |
| 6,371,645 B1 | 4/2002 | Rusert et al. | |
| 6,391,200 B2 | 5/2002 | Pulek et al. | |
| 6,692,637 B2 | 2/2004 | Fox et al. | |
| 6,726,751 B2 | 4/2004 | Bause et al. | |
| 6,746,760 B2 | 6/2004 | Minemura et al. | |
| 6,908,550 B2 | 6/2005 | Silverstein | |

(Continued)

FOREIGN PATENT DOCUMENTS

| WO | WO 91/08037 | 6/1991 |
|---|---|---|
| WO | WO 02/095112 | 11/2002 |
| WO | WO 03/045532 | 6/2003 |

*Primary Examiner* — Benjamin Kurtz

(74) *Attorney, Agent, or Firm* — Fox Rothschild, LLP; Robert J. Sacco

(57) ABSTRACT

A method is provided for filtering a fluid including contaminant and or sediment particles. The method includes the steps of: selecting a particle of a first size to be filtered; selecting a first mesh material having a pore size greater than the first size; and selecting a number of layers of the first mesh material for forming a filtration material having an absolute micron rating. The absolute micron rating has a value equal to or less than the first size. The method also includes the step of arranging the layers of first mesh material in a manner so as to form a stack of first mesh material. The method further includes the step of passing a fluid through the stack of first mesh material.

25 Claims, 5 Drawing Sheets

U.S. PATENT DOCUMENTS

| | | |
|---|---|---|
| 6,966,939 B2 | 11/2005 | Ramming et al. |
| 6,998,155 B2 | 2/2006 | Haggquist et al. |
| 8,142,668 B2 * | 3/2012 | Goldman .................... 210/806 |
| 2001/0004061 A1 | 6/2001 | Popoff et al. |
| 2006/0096910 A1 | 5/2006 | Brownstein et al. |
| 2006/0231480 A1 * | 10/2006 | Palacios Donaque ........ 210/437 |
| 2007/0175817 A1 | 8/2007 | Goldman |
| 2009/0101596 A1 | 4/2009 | Goldman |
| 2009/0107930 A1 | 4/2009 | Goldman |

* cited by examiner

METHODOLOGY FOR FILTERING A FLUID USING A PLURALITY OF SURFACE FILTRATION MEDIUMS

BACKGROUND OF THE INVENTION

1. Statement of the Technical Field

The invention concerns filtration equipment. More particularly, the invention concerns a method for filtering contaminant and/or sediment particles from a fluid being pumped (or passed) through a filtration material. The filtration medium is formed of layers of mesh material with passages greater in size than the particles.

2. Description of the Related Art

A filter typically consists of a cartridge or bag for use in a pressurized filter system. A pressurized filter system utilizing filter bags is typically comprised of a filter housing having a body and a cover. The body contains a filter basket for placing the filter bag therein. The filter housing is comprised of a mounting stand, an input orifice and an output orifice. A contaminated fluid is pumped into the filter housing through the input orifice. The contaminated fluid is filtered as it flows through the filter bag and then exists through the output orifice. Such a pressurized filter system is disclosed in U.S. Pat. No. 5,246,581.

As should be understood, a filter bag is typically composed of a pre-filtration layer, a filtration layer and a post-filtration layer. Each layer is co-extensive with the surface area of the filter bag. The pre-filtration layer is the inside layer, and thus would be the inside of the filter bag. The pre-filtration layer is often referred to as the upstream layer. The pre-filtration layer is formed of a single layer of a pre-filter material, such as a mesh material. The pre-filtration layer acts as a strainer, i.e., collects large particles from a fluid being pumped through the filter bag.

The post-filtration layer is the outside layer, and thus would be the outside of the filter bag. The post-filtration layer is often referred to as the downstream layer. The post-filtration layer is often formed of a fibrous fabric, such as a non-woven spunbond material. The post-filtration layer is typically joined to the other two (2) layers utilizing any technique known in the art, such as an ultrasonic welding technique. The post-filtration layer is configured to provide structural support to the pre-filtration and filtration layer so that they will not fail (i.e., deform, ripe, teal or break) during a filtration process.

Despite the advantages of such a filter bag, it suffers from certain drawbacks. For example, if a fluid including a large amount of sediment is pumped (or passed) through the filter bag, then the pre-filtration layer experiences premature blinding (or caking). The term "blinding" as used herein refers to the clogging of a filtration medium when pores (or passages) become sealed off due to a buildup of sediment particles during a filtration process. The blinding (or caking) results in an obstruction to the flow of the fluid being pumped (or passed) through the filter bag. The premature blinding provides a filter bag with a relatively short life span. Moreover, the mesh material has inconsistent and undefined pore (or passage) sizes. As such, the pre-filtration layer has only an approximate (or nominal) pore size rating. In effect, the pre-filtration layer is inefficient in collecting particles of a particular size.

In view of the forgoing, there remains a need for an improved method of filtering a fluid including a large amount of sediment. This method needs to eliminate or prevent premature blinding (or caking) of the pre-filtration material. There also remains a need for a filter bag or cartridge design which increases the efficiency of the filter material. A filter bag or cartridge design is further needed which optimally enhances fluid flow while providing an extended life span.

SUMMARY OF THE INVENTION

A method is provided for filtering a fluid including contaminant and/or sediment particles. The method includes the steps of: selecting a particle of a first size to be filtered; and selecting a first mesh material having a pore size greater than the first size. The first mesh material is formed of a woven mesh material and/or a non-woven mesh material. The first mesh material is also formed of a non-fiber shedding mesh material. The method also includes the step of selecting a number of layers of the first mesh material for forming a filtration material having an absolute micron rating. The absolute micron rating has a value equal to or less than the first size. The method further includes the steps of: arranging the layers of first mesh material in a manner so as to form a stack of first mesh material; and passing a fluid through the layers of first mesh material.

According to an aspect of the invention, the method includes the step of selecting a particle of a second size to be filtered. The method also includes the step of selecting a second mesh material having a pore size (a) greater than the second size and (b) less than the pore size of the first mesh material. The method further includes the step of selecting a number of layers of the second mesh material for forming a filtration material having an absolute micron rating. The absolute micron rating has a value equal to or less than the second size. The layers of second mesh material are arranged so as to form a stack of second mesh material. The stack of second mesh material is positioned (or placed) downstream from the stack of first mesh material.

According to another aspect of the invention, the method includes the step of selecting a depth filtration medium and placing the same downstream from the stack of first mesh material. The method also includes the steps of selecting an active medium and placing the same downstream from the stack of first mesh material. The active medium includes a granular or powdered material capable of removing organic contaminants from a fluid. Such granular or powdered materials include, but are not limited, to activated carbon, activated charcoal, filter-aid, ion-exchange resin or positively charged fibers. The method further includes the step of selecting a diffusion medium and placing the diffusion medium between filtration mediums.

A method is also provided to prevent blinding of a filter medium when filtering a fluid that is heavily laden with particulate matter. The method includes the step of selecting a filter material to include layers of a first mesh material. The first mesh material has a pore size larger than a first predetermined size of first particles. The first particles are particulate matter to be removed from a fluid. The method also includes the step of positioning the layers in a first stack so that each layer is transverse to a fluid flow direction. The method further includes the step of removing the first particles from the fluid by passing the fluid containing the first particles through the first layers of first mesh material. The first particles are captured in one or more intermediate layers of the filter material that are between an innermost layer and outermost layer of the stack.

According to an aspect of the invention, the method includes the step of selecting a predetermined number of layers to provide the filter material with an absolute micron filtration rating. The absolute micron filtration rating is less than the predetermined size of the first particles.

According to another aspect of the invention the filter material is also selected to include layers of a second mesh material. The second mesh material has a pore size larger than a second predetermined size of second particles. The second particles are particulate matter to be removed from a fluid. The layers of second mesh material are arranged in a second stack so that each layer is transverse to the fluid flow direction. The second particles are captured in one or more intermediate layers of filter material that are between an innermost layer and outermost layer comprising the second stack.

According to another aspect of the invention, the method includes the step of selecting a predetermined number of layers of second mesh material to provide a filter material with an absolute micron filtration rating. The absolute micron filtration rating is less than the second predetermined size of the second particles.

According to yet another aspect of the invention, the filter material is selected to include at least one layer of a depth filtration medium and an active medium. The at least one layer of medium is positioned so that each layer is transverse to a fluid flow direction. The at least one layer of medium is positioned so that each layer is downstream from the first stack. The filter material is also selected to include at least one layer of a diffusion medium. The diffusion medium is positioned between layers of the depth filtration medium and/or active medium.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention concerns a method for filtering a fluid including contaminant and/or sediment particles. The method provides a way to prevent the premature blinding (or caking) of a filtration material. The term "blinding" as used herein refers to the clogging of a filtration medium when an upstream surface containing pores (or passages) becomes sealed off due to a buildup of sediment particles during a filtration process. The above described feature of the present invention will become more evident as the discussion progresses.

Figure 1:
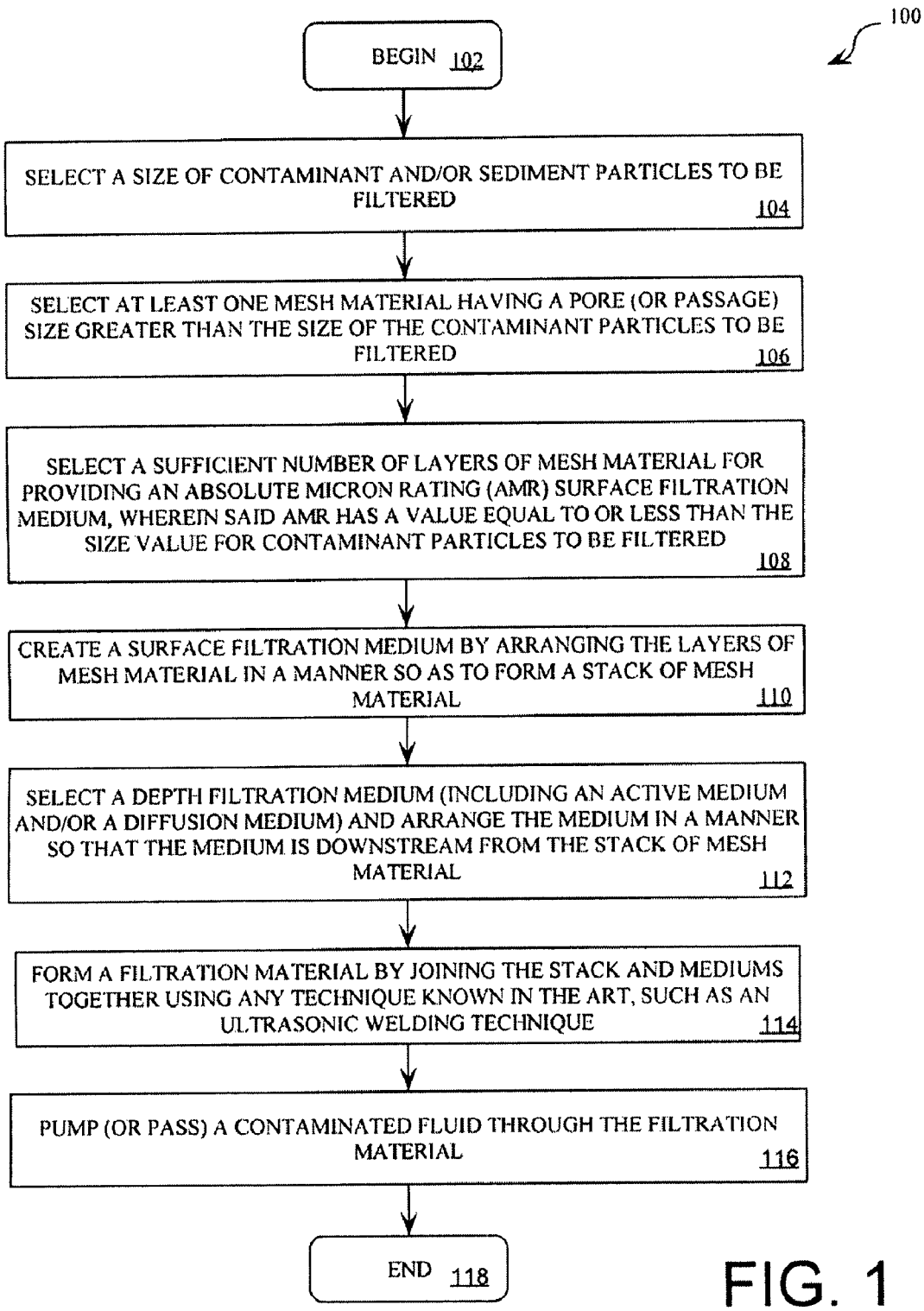
FIG. 1 is a flow diagram of a method for filtering a fluid including contaminant and/or sediment particles that is useful for understanding the present invention.

Referring now to FIG. 1, there is provided a flow diagram of a method 100 for filtering a fluid including contaminant and/or sediment particles. As shown in FIG. 1, the method 100 begins at step 102 and continues with step 104. In step 104, a size of a particle to be filtered (PTBF) is selected. For example, the size of the PTBF is selected to have a value equal to one hundred fifty (150) microns. Still, the invention is not limited in this regard.

Thereafter, the method 100 continues with step 106. In step 106, one or more mesh materials are selected. Significantly, the mesh materials are selected to have a pore (or aperture) size which is greater than the size of the PTBF. Mesh materials are well known to persons skilled in the art and therefore will not be described in detail herein. However, it should be appreciated that mesh materials are open materials with strands running in transverse directions. It should also be appreciated that the mesh materials can be highly porous woven or non-woven mesh materials. The highly porous woven or non-woven mesh material can be formed of a non-fiber shedding material. It should also be appreciated that the mesh materials can be made from any suitable material that is temperature and fluid compatible with the filtering application to be carried out. For example, a mesh material is made of a thermoplastic having polypropylene for low temperature filtering applications. Alternatively, a mesh material is made of a thermoplastic having nylon for high temperature filtering applications. Still, the invention is not limited in this regard.

Referring again to FIG. 1, the method 100 continues with step 108. In step 108, the number of layers of mesh material is selected. The number of layers is selected to be sufficient in combination for providing a surface filtration medium having a desired absolute micron rating (AMR). The surface filtration medium will be described in detail below in relation to step 110 and FIGS. 2-3. However, it should be understood that the AMR has a value less than or equal to the size value of the PTBF. Stated differently, a desired AMR can be achieved by using multiple layers of mesh with relatively larger pore or apertures. It should also be understood that the phrase "absolute micron rating" as used herein means that nearly one hundred percent (100%) of all particles larger than a stated micron size will be removed from a fluid being filtered.

Absolute micron ratings for various multilayer surface filtration mediums as described herein are listed in Table 1.

TABLE 1

| Micron Rating of | Number of Mesh Material Layers | | | | | |
|---|---|---|---|---|---|---|
| Mesh Material | 2 | 4 | 6 | 8 | 10 | 12 |
| 100 | 72.0 | 37.3 | 19.3 | 10.0 | 5.2 | 2.7 |
| 150 | 108.0 | 56.0 | 29.0 | 15.0 | 7.8 | 4.0 |
| 200 | 144.0 | 74.6 | 38.7 | 20.1 | 10.4 | 5.4 |
| 400 | 288.0 | 149.3 | 77.4 | 40.1 | 20.8 | 10.8 |
| 600 | 432.0 | 223.9 | 116.1 | 60.2 | 31.2 | 16.2 |

As illustrated in Table 1, the absolute micron rating achieved using the multi mesh layer as described is defined by: (a) a micron rating of a mesh material used to construct a surface filtration medium; and (b) the number of layers of mesh material used to form the surface filtration medium. For example, if a surface filtration medium is comprised of four (4) layers of a mesh material having a micron rating of four hundred (400), then an approximate value of the absolute micron rating of the surface filtration medium is computed using the following mathematical equation (1).

$$AMR = 0.72^{n-1} \cdot p \quad (1)$$

where AMR is an absolute micron rating, p is the pore size of each mesh layer, and n is the number of layers. Still, the invention is not limited in this regard.

Referring again to FIG. 1, the method 100 continues with step 110. In step 110, a surface filtration medium is formed by arranging the layers of mesh material in a manner so as to form a stack of mesh material. The surface filtration medium is a filtration medium comprised of a plurality of mesh layers, each of which only captures particles only on its surface. A schematic illustration of a surface filtration medium 200 catching particles 220 on its 3D surface is shown in FIG. 2.

Figure 2:
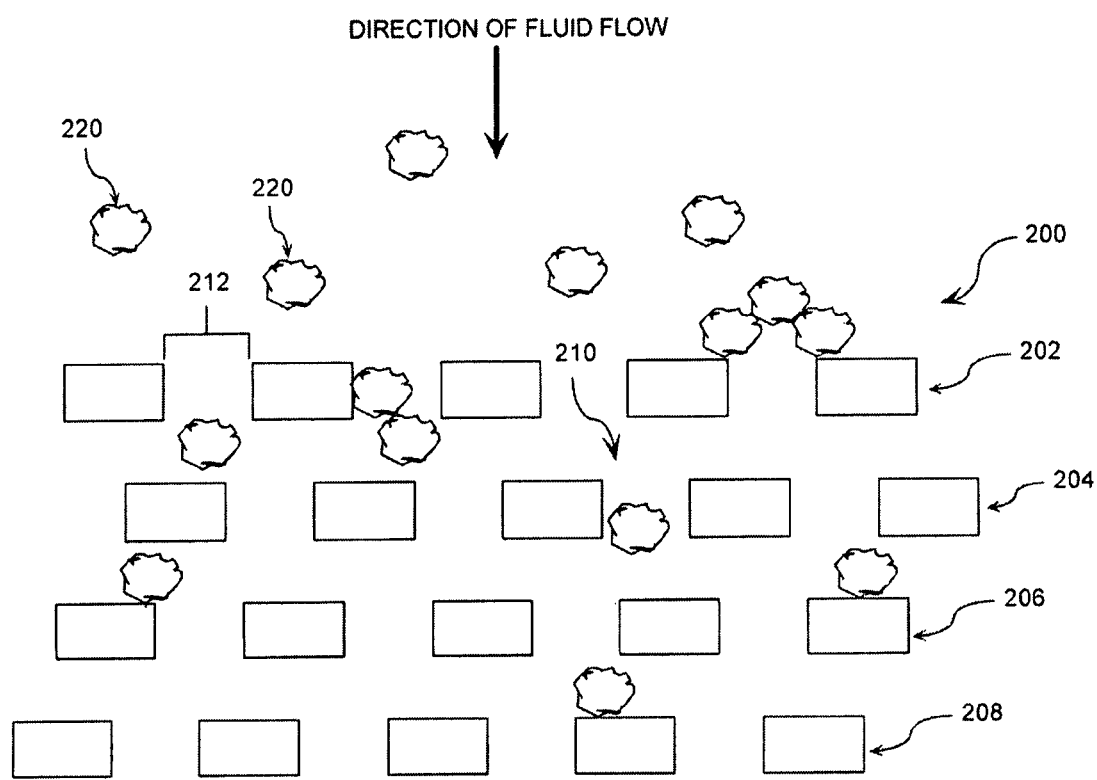
FIG. 2 is a greatly enlarged side view of a surface filtration medium capturing particles on its surface that is useful for understanding the invention.

As shown in FIG. 2, the surface filtration medium 200 is formed of layers of a highly porous mesh material 202, 204, 206, 208. Although the surface filtration medium 200 of FIG. 2 includes four (4) layers of a mesh material, the invention is not limited in this regard. For example, the layers 202, 204, 206, 208 can include: (a) two or more layers of a woven-mesh material: (b) two or more layers of the non-woven mesh material; or (c) two or more layers of a woven mesh material and a non-woven mesh material.

The multiple layers of mesh material 202, 204, 206, 208 advantageously provide a filtration material that has sufficient mechanical stability and strength so as to withstand the mechanical and hydraulic stresses to which the filtration material will be exposed when used in a high pressure filtration process. The multiple layers of mesh material 202, 204, 206, 208 also provide a surface filtration medium 200 with an increased surface area for collection of contaminants as compared to a filtration medium formed of a single layer of mesh material. It should be appreciated that the increased surface area is a three dimension (3D) surface area including a plurality of passages 210. In effect, the surface filtration medium also has: (a) a relatively high particle capacity as compared to conventional filtration mediums; (b) a relatively high fluid throughput as compared to conventional filtration mediums; and (c) an increased life span as compared to conventional filtration mediums. It should be noted that the features (a) and (b) result from a direct interception of particles by the surface filtration medium and a bridging of particles on the surface filtration medium. The term "bridging" as used herein refers to the collection of particles in a manner so as to form a bridge over a passage of a mesh material. Bridging is well known to persons skilled in the art, and therefore will not be described in great detail herein.

As shown in FIG. 2, the layers of a mesh material 202, 204, 206, 208 are not aligned with each other. Each layer of the mesh material 202, 204, 206, 208 has the same pore (or passage) structure 212. This pore (or passage) configuration advantageously provides a multilayer redundant architecture which achieves a desired AMR (described above in relation to step 108 FIG. 1) using mesh material having a pore size that is substantially larger than the AMR to prevent blinding. Still, the invention is not limited in this regard. For example, the surface filtration medium can alternatively include layers of a mesh material that are aligned with each other. The surface filtration medium can also alternatively include two or more stacks of mesh material. Each stack can consist of a mesh material having a different pore (or passage) structure as compared to the other stack(s). For example, a second stack of mesh layers downstream from the first stack can be formed of mesh material with a relatively smaller pore size. A schematic illustration of such an exemplary surface filtration medium is provided in FIG. 3.

Figure 3:
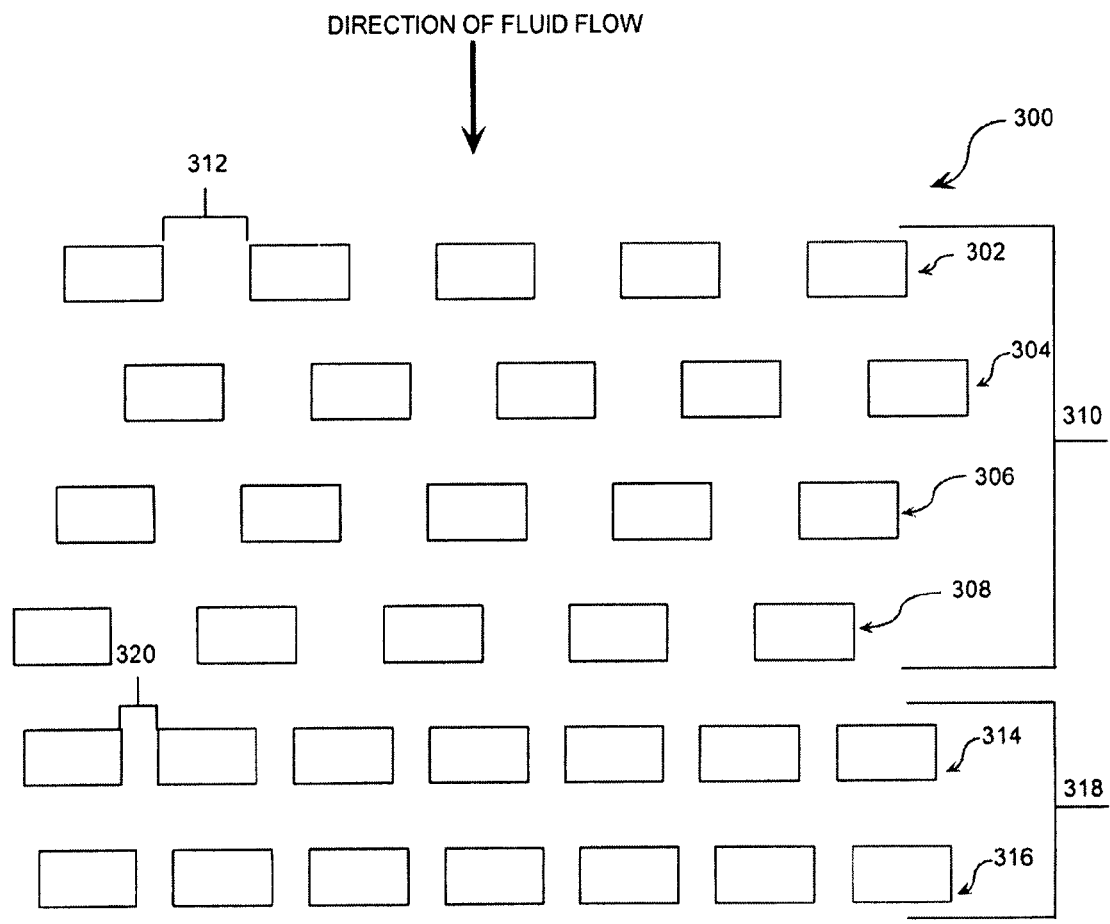
FIG. 3 is a greatly enlarged side view of a surface filtration medium having a graded (or tapered) pore structure that is useful for understanding the invention.

Referring now to FIG. 3, the exemplary surface filtration medium 300 is comprised of a first filtration medium 310 and a second filtration medium 318. The first filtration medium 310 includes a plurality of layers of a mesh material having a first pore (or passage) size 312. The second filtration medium 318 includes a plurality of layers of a mesh material having a second pore (or passage) size 320. The second pore (or passage) size 320 is greater than the first pore (or passage) size 312. Accordingly, the surface filtration medium 300 has a graded (or a tapered) pore structure. The graded (or tapered) pore structure provides a surface filtration medium 300 whereby the pore (or passage) size decreases in the direction of fluid flow. Still, the invention is not limited in this regard.

Referring again to FIG. 1, the method 100 continues with an optional step 112. In step 112, a depth filtration medium is selected which includes an active medium and/or a diffusion medium. Step 112 also involves arranging the selected depth filtration medium in a manner so that the medium is downstream from the surface filtration medium (described above in relation to FIGS. 2-3).

The depth filtration medium is a filtration medium that catches contaminants within its internal structure as well as on its surface. Depth filtration mediums are well known to persons skilled in the art, and therefore will not be described in great detail herein. However, it should be appreciated that such depth filtration mediums include, but are not limited to, absolute-rated micro-fiber materials. Such micro-fiber materials include glass fibrous materials, quartz fibrous materials, polyester fibrous materials and polypropylene fibrous materials.

The active medium can be provided for filtering and/or polishing purposes. In this regard, it should be understood that the active medium can remove organic contaminants from a fluid being pumped (or passed) through a filtration material. The active medium will now be described in greater detail in relation to FIGS. 4A-4B.

Figure 4A:
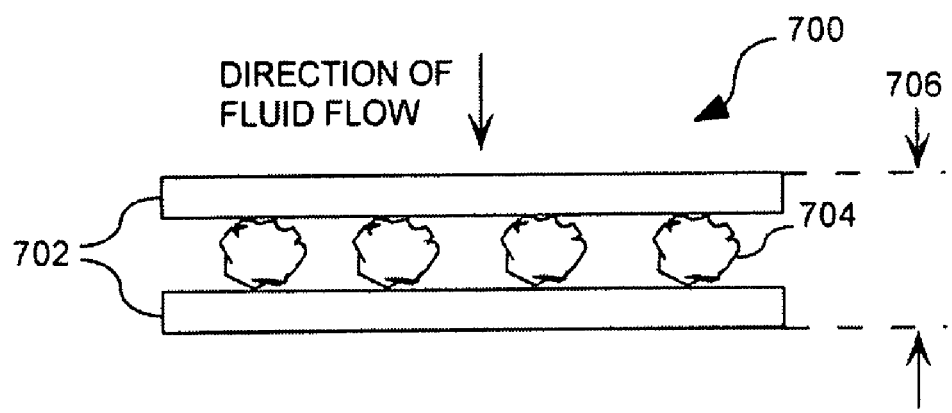
FIG. 4A is a schematic illustration of an active medium composed of a granular material disposed between thin wall substrates that is useful for understanding the invention.
Figure 4B:
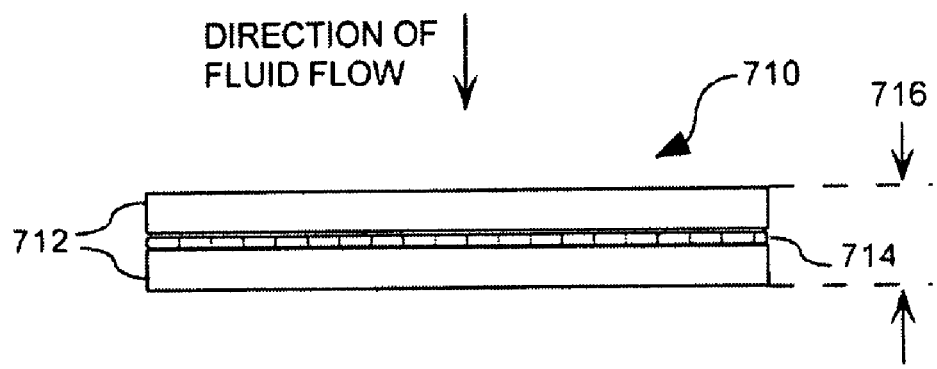
FIG. 4B is a schematic illustration of an active medium composed of a powdered material disposed between thin wall substrates that is useful for understanding the invention.

Referring now to FIG. 4A, there is provided an illustration of an active medium 400 composed of a granular material 404. An illustration of an active medium 410 composed of a powder material 414 disposed between thin wall substrates 412 is provided in FIG. 4B. It should be understood that the materials 404, 414 can be fixed between the thin wall substrates 402, 412 or embedded in fibers of the thin wall substrates 402, 412 using any physically restrictive method commonly known in the art for manufacturing an active medium. For example, such methods include, but are not limited to, a wet bonding technique, a heat bonding technique, an entangling method and a pressure bonding technique.

Each material 404, 414 is selected to be a material capable of removing chlorine, odors, sediment, other organic contaminants or other non-organic contaminants from a fluid being pumped through the active medium. Each material 404, 414 can also be selected as a material capable of removing minute quantities of solids, such as heavy metals, from an influent stream of fluid. Such materials 404, 414 include, but are not limited to, activated carbon, activated charcoal, filter-aid, ion-exchange resin and positively-charged fibers.

It should be noted that the materials 404, 414 can advantageously be selected to remove dissolved organic contaminants from liquids. The materials 404, 414 can also advantageously be selected to remove contaminants that affect liquid color and liquid odor. The amount of material 404, 414 disposed between the thin wall substrates 402, 412 can be selected to provide an increased life span of the active medium. For example, a large amount of material 404, 414 can provide an increased surface area for particle collection such that the material 404, 414 will not be depleted within a short amount of time, such as in days or weeks.

It should also be noted that the size of the granular material 404 can be selected in accordance with the particular filtration application. More particularly, the granular material 404 can be selected to have a large surface area for providing bonding sites for contaminant collection. For example, the granular material is preferably less than or equal to one (1) millimeter in size. Still, the invention is not limited in this regard.

Referring again to FIGS. 4A-4B, the thin wall substrates 402, 412 can be joined together using any technique known in the art, such as an ultrasonic welding technique. The thin wall substrates 402, 412 are selected to include a micro-fiber substrate. Such micro-fiber substrates include, but are not limited to, a polyester substrate, a polypropylene substrate, a fiberglass substrate, a polyamide substrate and a fluorocarbon substrate. The micro-fiber substrate includes fibers with identical or varying diameters.

The thin wall substrates 402, 412 are highly porous substrates configured to control fluid flow through the active mediums 400, 410, respectively. The active medium's 400, 410 thickness 406, 416 can be selected to provide for maximum filtration efficiency. This maximum filtration efficiency is achieved by providing a suitable contact time for contaminants to come in contact with a material 404, 414 when pumped through the filter bag.

The thickness 406, 410 of a respective active medium 400, 410 is selected in accordance with a particular filtration application. For example, the active medium 400 has a thickness 406 less than or equal to one and a half (1.5) millimeters (59 mils). Still, the invention is not limited in this regard.

Referring again to step 112 of FIG. 1, the selected diffusion medium can be a woven mesh material or a non-woven mesh material. Mesh materials are well known to persons skilled in the art, and therefore will not be described in great detail herein. The diffusion medium can be provided to act as a spacer between the layers of the depth filtration medium and/or the active medium. It should be understood that the diffusion medium can increase the life span of a filtration material by providing an increased surface area for collection of contaminants between layers of filtration media. By enlarging the surface area for collection of contaminants between layers of filtering medium, the diffusion medium can increase the fluid flow through a filtration material.

After step 112, the method 100 continues with step 114. In step 114, a filtration material is formed by joining the stack(s) of mesh material and mediums (selected in step 110) together using any suitable technique known in the art. Such techniques include, but are not limited to, an ultrasonic welding technique. Subsequent to step 114, step 116 is performed where a contaminated fluid is pumped (or passed) transversely through the surfaces defined by the various layers. Thereafter, step 118 is performed where the method 100 ends.

Figure 5:
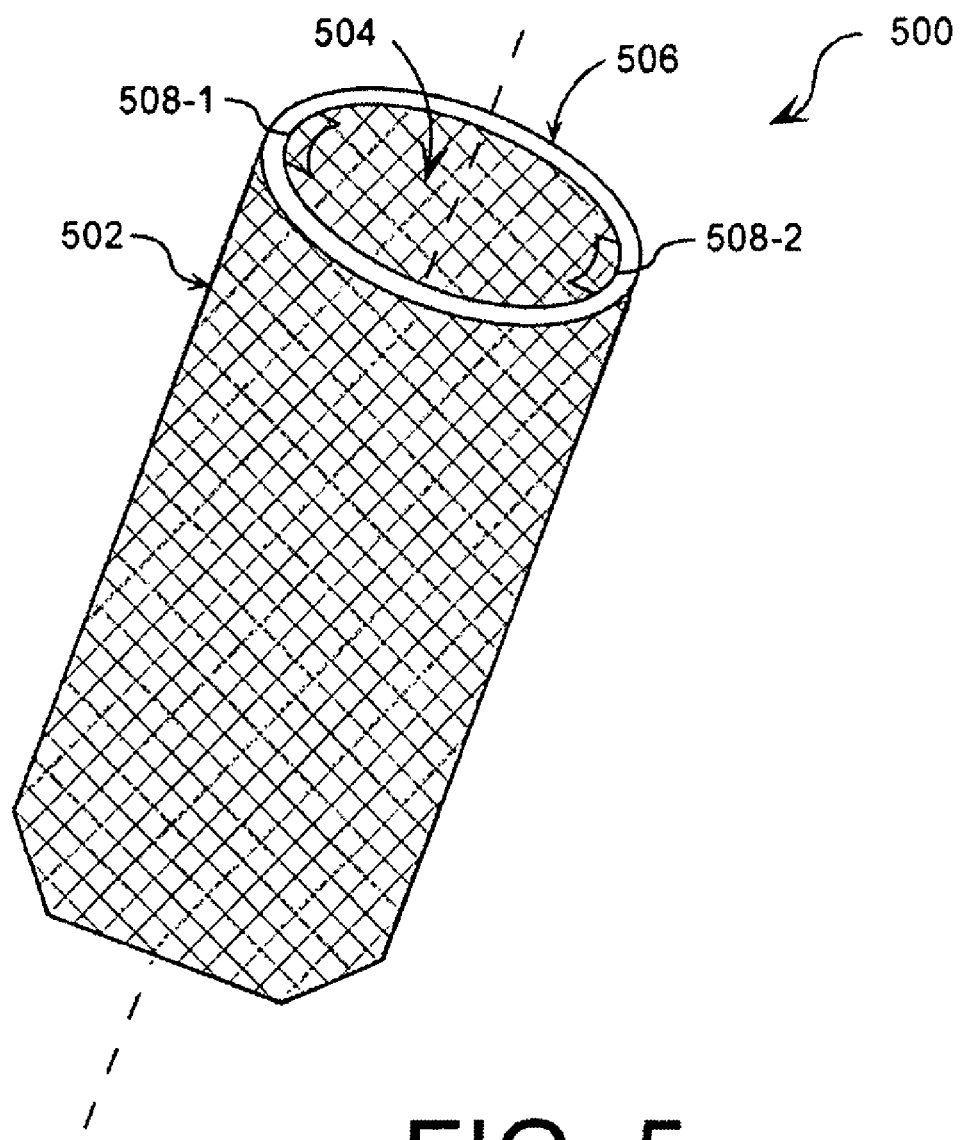
FIG. 5 is a perspective view of filter bag that is useful for understanding the present invention.

It should be noted that the above described method 100 call be implemented in a filter bag. An exemplary embodiment of a filter bag is provided in FIG. 5. As shown in FIG. 5, a filter bag 500 is comprised of a bag member 102, a ring member 106 and an input orifice 104. A contaminated fluid is pumped into the filter bag 100 through the input orifice 104. The fluid flows through the filter bag 100 to produce a filtered fluid. Such fluids include, but are not limited to, water, beverages, alcohols, pharmaceutical liquids, oils, cosmetic liquids and bio-fuels.

The bag member 102 is composed of a filtration material. The filtration material is the same as the filtration material formed in step 114 of FIG. 1. In this regard, it should be appreciated that the filtration material is comprised of one or more layers of filtering medium having a number of pores to control fluid flow. Each layer of filtering medium is selected to include a medium suitable for a particular filtration application. Such mediums include, but are not limited to, a surface filtration medium (described above in relation to step 110 of FIG. 1), a depth filtration medium (described above in relation to step 112 of FIG. 1), an active medium (described above in relation to step 112 of FIG. 1) and a diffusion medium (described above in relation to step 112 of FIG. 1). The filter material can have an identical pore structure or a graded (or tapered) pore structure. The graded (or tapered) pore structure provides a filter material whereby a pore size can decrease in the direction of fluid flow, i.e. from an input orifice 104 through) the filter bag 100. The ring member 106 is comprised of one or more handles 108-1, 108-2. The ring member 106 is made of a semi-rigid material, such is a thermoplastic.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for filtering a fluid that is laden with particles, comprising the steps of:
    selecting a first size of said particles to be filtered;
    selecting a first mesh material having a pore size greater than said first size, said first mesh material exclusively configured to capture particles on its surface;
    selecting a number of discrete layers n of said first mesh material for forming a filtration medium having a first particle capacity for holding said particles;
    arranging a plurality of discrete layers of said first mesh material in a manner so as to form a stack of first mesh material;
    determining a first absolute micron rating (AMR) desired for said filtration medium; and
    selecting said first mesh material to have a pore size p which approximately satisfie the equation $AMR = 0.72^{n-1} * p$.

2. The method according to claim 1, further comprising the step of selecting said first mesh material to include at least one of a woven mesh material and a non-woven mesh material.

3. The method according to claim 2, further comprising the step of selecting said first mesh material to include a non-fiber shedding mesh material.

4. The method according to claim 1, further comprising the step of selecting a second size of said particles to be filtered.

5. The method according to claim 4, further comprising the step of selecting a second mesh material having a pore size (a) greater than said second size and (b) less than said pore size of said first mesh material, said second mesh material exclusively configured to capture particles on its surface.

6. The method according to claim 5, further comprising the step of selecting a number of layers of said second mesh material for forming a filtration medium having a second particle capacity and a second absolute micron rating, said second absolute micron rating having a value equal to or less than said second size.

7. The method according to 6, further comprising the step of arranging a plurality of discrete layers of said second mesh material so as to form a stack of said second mesh material.

8. The method according to claim 7, further comprising the step of placing said stack of said second mesh material downstream from said stack of said first mesh material.

9. The method according to claim 1, further comprising the step of selecting a depth filtration medium and placing the same downstream from said stack of first mesh material.

10. The method according to claim 1, further comprising the step of selecting an active medium and placing the same downstream from said stack of first mesh material.

11. The method according to claim 10, further comprising the step of selecting said active medium to include a granular or powdered material capable of removing organic contaminants from a fluid.

12. The method according to claim 10, further comprising the step of selecting said active medium to include activated carbon, activated charcoal, filter-aid, ion-exchange resin or positively charged fibers.

13. The method according to claim 1, further comprising the step of selecting a diffusion medium and placing said diffusion medium between a plurality of filtration mediums.

14. A method to prevent blinding of a filter medium when filtering a fluid that is heavily laden with particulate matter, comprising:
selecting a filter medium to include a plurality of n discrete layers of a first mesh material having a first particle capacity for holding said particulate matter;
selecting said plurality of n discrete layers to have a pore size larger than a first predetermined size of first particles comprising said particulate matter to be removed from a fluid, said first mesh material exclusively configured to capture particles on its surface;
positioning said plurality of layers in a first stack with each layer arranged transverse to a fluid flow direction;
determining an absolute micron rating (AMR) desired for said filter medium; and
selecting said first mesh material to have a pore size p which approximately satisfies the equation $AMR=0.72^{n-1}*p$.

15. The method according to claim 14, further comprising removing said particles from said fluid by passing said fluid containing said particles through said first plurality of layers, and capturing said first particles in one or more intermediate layers of said filter material that are between an innermost layer and outermost layer comprising said stack.

16. The method according to claim 15, further comprising selecting said filter medium to further include a second plurality of discrete layers of a second mesh material having a pore size larger than a second predetermined size of second particles comprising said particulate matter to be removed from a fluid, said second mesh material exclusively configured to capture particles on its surface.

17. The method according to claim 16, further comprising positioning said second plurality of discrete layers in a second stack with each layer arranged transverse to said fluid flow direction.

18. The method according to claim 17, wherein said removing step further comprises capturing said second particles in one or more intermediate layers of said filter material that are between an innermost layer and outermost layer comprising said second stack.

19. The method according to claim 17, further comprising:
selecting said second stack to include a number of discrete layers m of said second mesh material having a second particle capacity;
determining for said second stack a desired second absolute micron rating ($AMR_2$) that is less than said second predetermined size of said second particles; and
selecting said second mesh material to have a pore size $p_2$ which approximately satisfies the equation $AMR_2=0.72^{m-1}*p_2$.

20. The method according to claim 17, further comprising selecting a predetermined number of layers for said second plurality of discrete layers to provide said second stack with an absolute micron filtration rating that is less than said second predetermined size.

21. The method according to claim 14, further comprising selecting said filter medium to further include at least one layer of a depth filtration medium and an active medium, and positioning said at least one of a depth filtration medium and an active medium so that each layer is transverse to a fluid flow direction and downstream from said first stack.

22. The method according to claim 21, further comprising selecting said filter medium to further include at least one layer of a diffusion medium, and positioning said at least one of diffusion medium between layers of said depth filtration medium and or layers of said active medium.

23. A method to prevent the occurrence of blinding when using a filter medium to filter a particulate laden fluid, comprising:
selecting a filter medium for removing first particles of a first particle size contained in said particulate laden fluid to include a plurality of n discrete first mesh layers, each formed of a first mesh material, and arranged in a first stack having a first particle capacity for holding said particulate, said first mesh material exclusively configured to capture particles on its surface;
selecting a first pore size of pores defined by said first mesh material to be larger than said first particle size;
selecting said first stack to include a predetermined number n of said discrete first mesh layers to form said filter medium;
determining an absolute micron rating (AMR) desired for said filtration medium that is less than or equal to said first particle size;
positioning said first stack transverse to a direction of flow of said particulate laden fluid;
passing said particulate laden fluid through said first stack to remove said first particles; and
selecting said first pore size p to satisfy the equation $AMR=0.72^{n-1}*p$.

24. The method according to claim 23, further comprising selecting said filter medium for removing second particles of a second particle size contained in said particulate laden fluid to include a plurality of discrete second mesh layers, each formed of a second mesh material, and arranged in a second stack having a second particle capacity for holding said particulate, said second mesh material exclusively configured to capture particles on its surface;
selecting a second pore size of pores defined by said second mesh material to be larger than said second particle size;
selecting said second stack to include a predetermined number of said second mesh layers to form said filter medium with an absolute micron rating that is less than or equal to said second particle size;
positioning said second stack transverse to a direction of flow of said particulate laden fluid; and passing said particulate laden fluid through said second stack to remove said second particles.

25. A method for designing a filter, comprising:
selecting a minimum size particle said filter is required to remove from a fluid;
selecting a value of n, where n is a number of discrete layers of a mesh material arranged in a stack to form said filter having a capacity for holding particulate matter;
selecting a desired absolute micron rating (AMR) of said filter;
selecting said mesh material to have a pore size p which approximately satisfies the equation $AMR=0.72^{n-1}*p$; and
selecting said mesh material exclusively to capture particles on its surface and selecting said pore size greater than said particle size.

* * * * *